Aug. 15, 1950  H. J. TURNER  2,519,163
ADJUSTABLE SEAT
Filed June 6, 1947
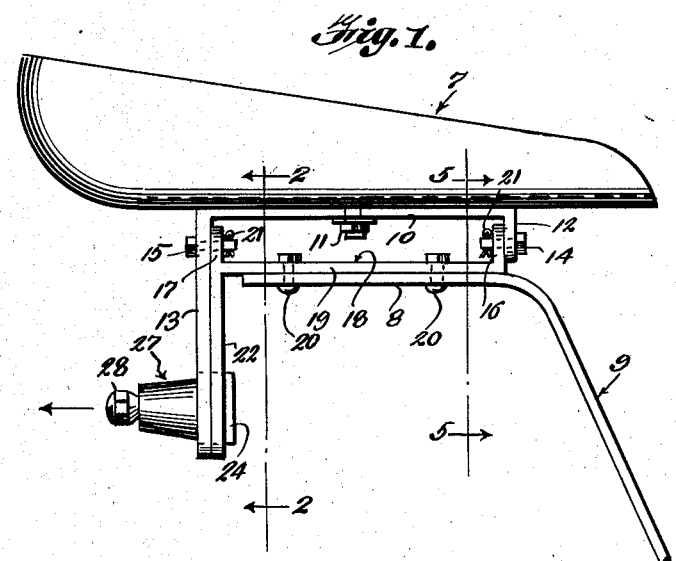
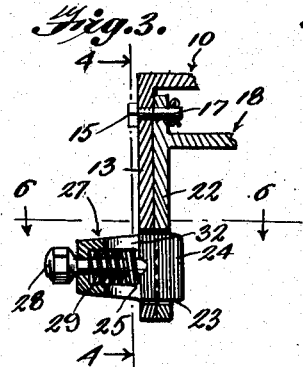
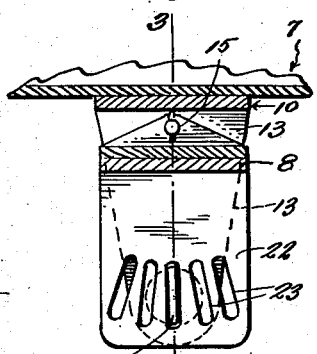
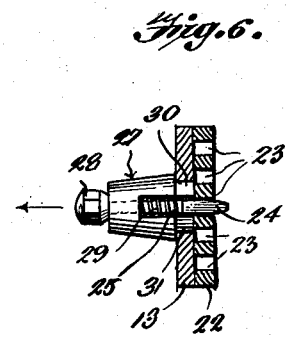
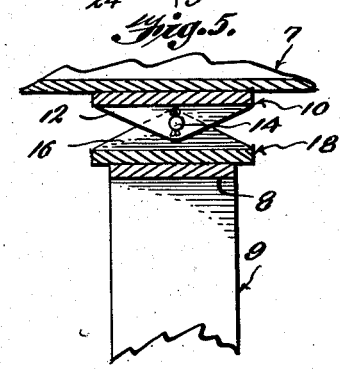
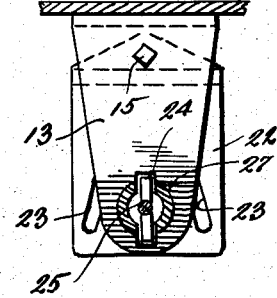
Inventor
HENRY J. TURNER
By Randolph & Beavers
Attorneys Patented Aug. 15, 1950

2,519,163

UNITED STATES PATENT OFFICE 2,519,163

ADJUSTABLE SEAT

Henry J. Turner, Birkenfeld, Oreg.

Application June 6, 1947, Serial No. 752,904

2 Claims. (Cl. 155—121)

My invention relates to improvements in adjustable seats for agricultural and like vehicles, the primary object of this invention being to provide improved and simplified construction whereby the desired lateral tilting of the seat to provide level support for the operator in canted positions of the vehicle may be quickly and easily produced without risk of mechanical or structural failure.

Another important object of this invention is to provide in seats of the character indicated above, more rugged and more positively acting, and hence more efficient and reliable, supporting and adjusting structure for the seats, which can be produced and installed at no increase in cost of labor and materials over less desirable arrangements of similar type.

Other important objects and advantageous features of this invention will be apparent from the following description and appended drawings, wherein, merely for purposes of illustration, a preferred embodiment is set forth in detail.

In the drawings:

Figure 1 is a right hand side elevation.

Figure 2 is a fragmentary transverse vertical section, taken on the line 2—2 of Figure 1.

Figure 3 is a vertical longitudinal section taken on the line 3—3 of Figure 2.

Figure 4 is a transverse vertical section taken on the line 4—4 of Figure 3.

Figure 5 is a transverse vertical section taken on the line 5—5 of Figure 1, and Figure 6 is a horizontal section taken on the line 6—6 of Figure 3.

Referring in detail to the drawings, the numeral 7 generally designates a common bucket form of agricultural implement seat, mounted on a horizontal portion 8 of a semi-flexible seat bar 9 rising from the implement or vehicle (not shown).

In accordance with the present invention, adjustable support of the seat bucket 7 upon the horizontal bar portion 8 is effected by means of a downturned or inverted U-shaped upper seat bracket 10, suitably fixed, as at 11, to the underside of the seat bucket along the longitudinal middle thereof, and having a short forward depending leg 12, and a substantially longer depending rear leg 13 which extends for a considerable distance below the horizontal portion 8 of the seat bar 9 and is somewhat downwardly tapered, as shown in Figure 4. The legs 12 and 13 are pivoted by smooth, headed pins 14 and 15, respectively, passing, on a coincidental axis parallel with the bracket 10 and seat bar portion 8, through the bracket legs 12 and 13 and vertical arms 16 and 17, respectively, on the forward and rearward ends of lower U-shaped seat bracket 18 whose main portion 19 is suitably fixedly secured as indicated at 20, to the horizontal seat bar portion 8. Cotter keys 21, or the like, may be used on the pivot pins 14 and 15, to hold the pins in place.

The rear end of the lower seat bracket 18 has a perpendicular downward extension 22 which is rectangular as indicated in Figures 2 and 4, whereby it is effectively wider than the tapered upper seat bracket leg 13 which it parallels in substantially touching relation to the forward side of the full length thereof.

The wide rectangular extension acts as a detent plate and for this purpose is formed near its lower end with a plurality of laterally spaced detent slots 23 which are disposed on radii of the pivoted axis of the seat pivot pins 14 and 15. The slots 23 are relatively long in order to accommodate a relatively long and hence structurally strong and heavy detent 24, so that when the seat bucket 7 is in a horizontal position, corresponding to the middle slot 23, or in a laterally tilted position, corresponding to one of the remaining slots 23 with the extra heavy detent, which is mounted on the upper seat bracket leg 13, engaged in the corresponding one of the slots, the bucket seat will be fixedly and firmly held in the selected position.

The detent 24 has a shaft or pin 25, secured midway of its rear edge, which works through the rear end 26 of a cup-shaped detent housing 27, where the pin 25 is provided with an enlarged operating head or handpiece 28. An expanding helical spring 29 is circumposed on the pin 25 between the end 26 of the housing 27 and the rear edge of the detent 24 for pushing and holding the detent engaged in the selected one of the slots 23 when the handpiece 28 is released, the seat bucket 7 having been tilted to the desired position with the detent retracted against the resistance of the spring.

The detent housing includes a reduced cylindrical portion 30 seating in a corresponding opening 31 formed in the seat bracket leg 13 and slotted like the housing 27, as indicated at 32 for freely supporting the detent 24 in retracted and in locking positions. The adjacent end of the housing and/or the reduced portion 30 thereof are suitably fixed to the leg 13.

I claim as my invention:

1. A seat for an agricultural implement or the like, having a seat bracket including a horizontal part, said seat comprising a seat element, an upper bracket member supportably secured to said seat element and having a relatively short forward depending leg and a relatively long rearward depending leg having a vertical slot adjacent the lower end thereof, a lower bracket member secured along said horizontal part of said seat bracket and having forward and rearward uprights positioned alongside of said forward and rearward depending legs of said upper bracket member and pivoted thereto on a longitudinal axis whereby said seat element and said upper bracket member can together be tilted to either side from a perpendicular middle position, an extension depending from the rear of said lower bracket member along the forward side of said long rearward leg of said upper bracket member, and detent means cooperating with said long rearward leg and said extension for locking the same relative to each other to hold said seat element in the middle position or a selected tilted position to either side of said middle position, said detent means comprising a forwardly spring pressed retractable detent mounted on the lower part of said rearward long leg and extending through the slot therein and selectively engageable with a plurality of detent receiving openings formed in the lower part of said extension.

2. A seat for an agricultural implement or the like, having a seat bracket including a horizontal part, said seat comprising a seat element, an upper bracket member supportably secured to said seat element and having a relatively short forward depending leg and a relatively long rearward depending leg having a vertical slot adjacent the lower end thereof, a lower bracket member secured along said horizontal part of said seat bracket and having forward and rearward uprights positioned alongside of said forward and rearward depending legs of said upper bracket member and pivoted thereto on a longitudinal axis whereby said seat element and said upper bracket member can together be tilted to either side from a perpendicular middle position, an extension depending from the rear of said lower bracket member along the forward side of said long rearward leg of said upper bracket member, and detent means cooperating with said long rearward leg and said extension for locking the same relative to each other to hold said seat element in the middle position or a selected tilted position to either side of said middle position, said detent means comprising a detent housing mounted on the lower part of said long leg, a detent pin slidably mounted therein and extending through said slot, a vertically elongated detent fixed on the forward end of said pin and forwardly and rearwardly movable through opening means provided in said housing and in said long leg, spring means normally urging said detent forwardly toward said depending extension, handhold means on said detent pin for manually retracting said detent against the tension of said spring means, the lower part of said extension being formed with an arc consisting of a plurality of circumferentially spaced, vertically elongated keeper slots into which said vertically elongated detent is adapted to be selectively projected to lock said seat element in different tilted positions and the middle position thereof.

HENRY J. TURNER.

REFERENCES CITED

The following references are of record in the file of this patent:

UNITED STATES PATENTS

| Number | Name | Date |
|---|---|---|
| 511,573 | Wilkinson | Dec. 26, 1893 |
| 659,216 | Dowling | Oct. 6, 1900 |
| 905,634 | Beaham | Dec. 1, 1908 |
| 1,179,598 | Zink | Apr. 18, 1916 |